United States Patent Office 3,157,328
Patented Nov. 17, 1964

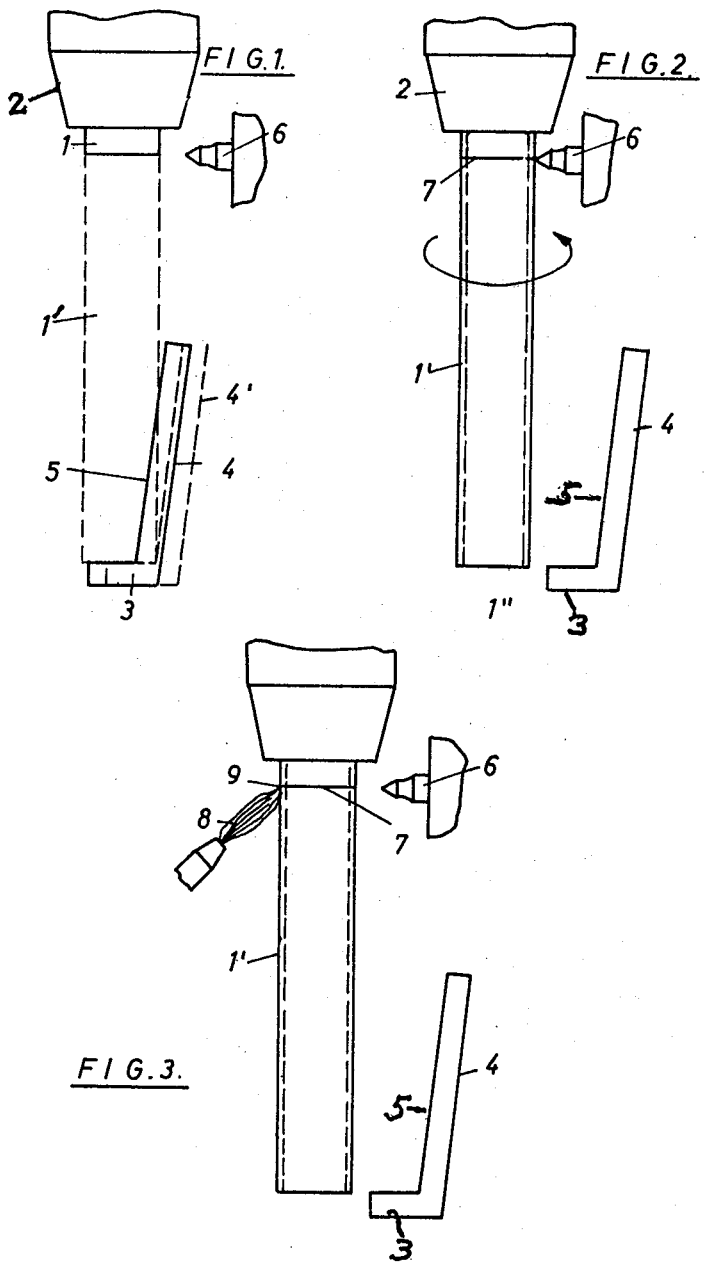

3,157,328
METHOD OF AND APPARATUS FOR CUTTING GLASS TUBES
Werner Hennings, Am Brunnen 12, Bunde, Westphalia, Germany, and Ehrenfried Zimmermann, Haus Danuser, Klosters, Graubunden, Switzerland
Filed Sept. 17, 1959, Ser. No. 840,730
Claims priority, application Germany Sept. 24, 1958
9 Claims. (Cl. 225—2)

This invention relates to apparatus and methods for cutting a glass tube.

It is known to cut a glass tube into individual lengths in various ways. This operation is generally effected either by using a cutting device or by breaking off the tube part using a quenching process. However, only in the cases of relatively large tube diameter or a correspondingly large ratio of diameter to wall thickness, do the known processes provide sufficiently smooth breaks such as are required or desirable for the further working up of the separated parts. In the case of thick glass tubes and small diameters the former separating methods are unsatisfactory. Jagged breaks and splinters occur, which cause great difficulty in the further working up of the blanks to form bottles, ampoules and the like. In most cases, these difficulties have to be overcome by complicated and expensive cleaning processes or else they make further working up quite impossible.

The object of the present invention is to provide improved methods of cutting and an apparatus for cutting glass tubes, especially a tube of small diameter and relatively large wall thickness.

In a method for cutting a glass tube according to the invention, the glass tube is, in the first instance, set in rotation for the purpose of cutting, and is lightly scored all round the line of separation by means of a cutting device, is then stopped, and is heated by a small flame at a point on the score line, until the free end of the glass tube breaks off.

Apparatus provided for this purpose comprises a clamping device in which a relatively long stock glass tube is inserted from above, is held fast, and by means of which it can be set in rotation by a motor drive, while a cutting device is automatically brought against said tube and scores the glass along a peripheral line, while further means are provided in order to bring against the glass tube after scoring a small breaking flame which, with the tube stationary, effects the separation of the tube end at the score line.

In order that the invention may readily be carried into effect, one embodiment will now be described in detail, by way of example, with reference to the accompanying drawings, of which:

FIG. 1 is a diagram of the separating device before the scoring process;

FIG. 2 shows the same during the scoring process; and

FIG. 3 shows the same during the heating of the separating point.

In the figures, reference 1 denotes a stock glass tube, which is held in a holder or chuck 2, which is periodically coupled to a motor drive, not shown, which can rotate the holder and the tube. The rotation and stoppage are supervised by control means, not shown, for example by a cam control. By means of a control element, which is likewise not shown, the holder 2 is opened at the moment shown in FIG. 2, so that the glass tube 1 drops the part 1' shown in broken lines in FIG. 1, until it is caught by a projection 3 of a lever 4, on which it is supported. The movement is advantageously decelerated by an inclined plane 5 of the lever 4, which is moved laterally into the position 4' shown in broken lines, by means which are not shown. When the end of the glass tube has reached the position 1" shown at FIGURE 2, the holder closes again and the lever 4 is moved laterally out of the range of the glass tube into the position shown in FIG. 2. At the same time, a scoring device 6, for example a rotating diamond cutting wheel or a steel file or steel cutting wheel, is brought against the tube 1 and a score 7 produced. The score need be made only relatively slightly and the tolerances in this respect are only minor. The scoring device 6 is then withdrawn into the position shown in FIGS. 3 and 1, and the rotation of the holder 2 and of the tube 1 is interrupted, that is to say the tube brought to rest. As shown at FIGURE 3, a small flame 8 is now brought against the score line 7, and by means of this flame only a point 9 at the periphery of the score 7 is heated owing to the fact that the tube 1 is stationary. The resulting local temperature increase causes the tube part 1' to break off, the separation being effected exactly along the prepared scored line of separation 7 and without the formation of jagged edges or appreciable splinters. The tube part 1' then drops into a storage container or a packing device which are not shown in detail.

After separation, the stock tube 1 may be subjected to the action of a flame either in the same machine or during the further treatment, in such manner that the lower edge 1" of the glass tube is rounded off. Rounding off of the other side of the tube part is generally not necessary, especially if this side is subjected to relatively considerable modification, for example for the purposes of forming an end.

The new method permits not only a very dependable splinter-free cutting, but also a considerable increase in output, since only very short times are required for scoring and breaking off. The increase in output further has a favourable effect in that the apparatus requires only little space and accordingly it is possible to combine in simple manner into a single machine a relatively large number of cutting devices of the kind described. A single motor is then sufficient for all the cutting devices.

What we claim is:

1. That method of severing a glass tube comprising, effecting relative rotation between the tube and a scoring device to effect a closed, endless, scored line exteriorly of, on and about the tube lying in a plane normal to the axis thereof, and thereafter applying heat to one point only on said line.

2. That method of severing a glass tube comprising rotating the tube about its longitudinal axis while holding a stationary scoring device against the external surface of the tube to effect a closed scored line in said tube in a plane normal to the axis thereof, stopping rotation of said tube, and thereafter applying heat at one point only on said scored line.

3. That method of severing a glass tube comprising effecting relative rotation between the tube and a scoring device in exterior contact with said tube, to make a closed scored line about the periphery of said tube, and thereafter applying a flame to said tube to heat the same at a single point only on said scored line to thereby effect severing of the tube along said line.

4. A mechanism for severing a glass tube comprising, means for rotating said tube about its longitudinal axis, means for holding a fixed scoring tool exteriorly against said tube at the desired location of severance to form a closed scored line, and means for applying heat to a single point only on said line after scoring.

5. In a mechanism for severing glass tubing into selected lengths, means for rotating a length of tubing about its longitudinal axis, a scoring tool fixed longitudinally with respect to said axis and radially movable thereof into contact with said length of tubing to externally score the same in a line lying in a plane normal to the axis of rotation, and means operable to apply heat to a point only on said scored line while said length of tubing is positioned in said means for rotating.

6. A mechanism as in claim 5, said axis of rotation being vertical, and a stop member movable transversely of said axis into intersection therewith a predetermined axial distance below said scoring tool.

7. A mechanism as in claim 6, said stop member having a first abutment surface inclined at an acute angle to said axis and a second abutment surface below said first surface and normal to said axis, said stop member being movable laterally of said axis from a first position wherein the lower end of a descending length of tubing strikes said first surface to effect deceleration of said length of tubing, to a second position wherein said lower end engages said second abutment only.

8. That method of severing a glass tube having a longitudinal axis of symmetry, comprising, rotating said tube about said axis, advancing a scoring tool along a straight line normal to said axis into contact with the rotating tube to score the same along a closed line lying in a plane normal to said axis, withdrawing said tool along said straight line out of contact with said tube, stopping rotation of said tube and maintaining the same motionless while advancing a small flame toward and into proximity with said tube, to apply heat from said flame to said tube at one point only on said scored line, to thereby initiate a break at said point followed by a clear automatic severance of the tube along said scored line.

9. The method of cutting into sections of predetermined lengths, a long vertically-disposed length of glass tubing, comprising, mounting the lower end of said length of tubing in a chuck to project therebelow a distance a little greater than said predetermined length, clamping the tubing in said chuck, rotating the chuck to correspondingly rotate the tubing about its longitudinal axis while advancing a scoring tool into external contact with the tubing below the chuck in a plane normal to said axis a distance equal to said predetermined length above the lower end thereof, to make a complete endless scored line on the tubing in said plane, stopping rotation of the chuck and tubing, and thereafter advancing a pointed flame to contact the scored line at a single point only to thereby effect a clean break of the tubing along said scored line, opening the chuck to allow the remaining length of tubing to descend through the chuck, stopping descent of the tubing relatively to the chuck when the free lower end thereof is at predetermined distance below said plane, again clamping the tubing in the chuck and repeating the aforesaid steps until the entire length of tubing has been severed into sections each of said predetermined lengths.

References Cited in the file of this patent

UNITED STATES PATENTS

| | | |
|---|---|---|
| 610,588 | Schrader | Sept. 13, 1898 |
| 1,046,723 | Beadle | Dec. 10, 1912 |
| 1,135,652 | Bartlett | Apr. 13, 1915 |
| 1,263,644 | Cervenka | Apr. 23, 1918 |
| 1,313,845 | Verinkhaf | Aug. 19, 1919 |
| 1,338,941 | Lindahl | May 4, 1920 |
| 1,482,272 | Smith | Jan. 29, 1924 |
| 1,974,399 | Hofmann et al. | Sept. 18, 1934 |
| 2,116,129 | Stringer | May 3, 1938 |
| 2,169,455 | Wagner | Aug. 15, 1939 |
| 2,378,091 | McCormick | June 12, 1945 |
| 2,571,066 | Schreiber | Oct. 9, 1951 |
| 2,584,851 | Dunipace | Feb. 5, 1952 |
| 2,675,648 | Martin | Apr. 20, 1954 |
| 2,704,418 | Gerbaud | Mar. 22, 1955 |
| 2,764,847 | Buell | Oct. 2, 1956 |
| 3,036,405 | Dinwell et al. | May 29, 1962 |

FOREIGN PATENTS

| | | |
|---|---|---|
| 129,394 | Great Britain | July 14, 1919 |